(12) United States Patent
Groll

(10) Patent No.: US 7,960,034 B2
(45) Date of Patent: *Jun. 14, 2011

(54) MULTI-PLY COOKWARE WITH COPPER-ALUMINUM-STAINLESS STEEL

(75) Inventor: William A. Groll, McMurray, PA (US)

(73) Assignee: All-Clad Metalcrafters LLC, Canonsburg, PA (US)

( * ) Notice: Subject to any disclaimer, the term of this patent is extended or adjusted under 35 U.S.C. 154(b) by 563 days.

This patent is subject to a terminal disclaimer.

(21) Appl. No.: 12/059,233

(22) Filed: Mar. 31, 2008

(65) Prior Publication Data

US 2008/0241582 A1  Oct. 2, 2008

Related U.S. Application Data

(60) Provisional application No. 60/921,100, filed on Mar. 30, 2007.

(51) Int. Cl.
*B32B 15/18* (2006.01)
*B32B 15/20* (2006.01)
*A47J 36/02* (2006.01)
(52) U.S. Cl. ........ 428/653; 428/654; 428/673; 428/685; 220/573.1
(58) Field of Classification Search .................. None
See application file for complete search history.

(56) References Cited

U.S. PATENT DOCUMENTS

| | | | | | |
|---|---|---|---|---|---|
| 2,539,247 | A | * | 1/1951 | Hensel | 228/205 |
| 2,767,467 | A | * | 10/1956 | Siegel | 228/190 |
| 3,165,828 | A | * | 1/1965 | Kennedy | 228/202 |
| 3,173,202 | A | * | 3/1965 | Farber | 228/173.2 |
| 3,496,625 | A | * | 2/1970 | Winter | 428/611 |
| 3,952,938 | A | * | 4/1976 | Ulam | 228/190 |
| 4,004,892 | A | * | 1/1977 | Ulam | 428/652 |
| 4,103,076 | A | * | 7/1978 | Ulam | 428/653 |
| 4,167,606 | A | * | 9/1979 | Ulam | 428/653 |
| 4,596,236 | A | * | 6/1986 | Eide | 219/621 |
| 4,646,935 | A | * | 3/1987 | Ulam | 220/573.1 |
| 5,551,415 | A | * | 9/1996 | Cartossi | 126/390.1 |
| 6,267,830 | B1 | | 7/2001 | Groll | |
| 6,926,971 | B2 | * | 8/2005 | Groll | 428/651 |
| 7,208,231 | B2 | * | 4/2007 | Groll | 428/653 |
| 2004/0137260 | A1 | * | 7/2004 | Groll et al. | 428/652 |
| 2004/0229079 | A1 | * | 11/2004 | Groll | 428/653 |
| 2007/0275263 | A1 | * | 11/2007 | Groll | 428/653 |

FOREIGN PATENT DOCUMENTS

KR  10-2006-0068608  *  6/2006

* cited by examiner

*Primary Examiner* — John J Zimmerman
(74) *Attorney, Agent, or Firm* — The Webb Law Firm

(57) ABSTRACT

Multi-ply composite cookware consisting of different metal combinations to include the beauty of copper on the exterior coupled with its excellent heat distribution/conductivity properties within the interior to provide thermally efficient, durable and cosmetically pleasing cookware. In several embodiments of the present invention, a layer of silver is also preferably employed in the interior thereof between adjacent aluminum layers to further improve thermal conductivity.

14 Claims, 2 Drawing Sheets

US 7,960,034 B2

MULTI-PLY COOKWARE WITH COPPER-ALUMINUM-STAINLESS STEEL

CROSS-REFERENCE TO RELATED APPLICATION

This application claims the benefit of U.S. Provisional Application No. 60/921,100 filed Mar. 30, 2007, and is incorporated herein by reference in its entirety.

BACKGROUND OF THE INVENTION

1. Field of the Invention

The present invention is directed to cookware and, more particularly, to composite roll bonded multi-ply cooking vessels containing layers of copper, aluminum and stainless steel in various combinations including, in some embodiments, a layer of silver bonded within the interior core of the composite.

2. Description of Related Art

Several prior art known constructions employing discrete roll bonded layers of copper, aluminum and stainless steel are shown in FIGS. 1 and 2 and, in themselves, are well known in the art and commercially available products marketed by All-Clad Metalcrafters LLC., the owner of the present patent application. FIG. 1 depicts a commercial line of cookware of All-Clad Metalcrafters LLC marketed under the registered trademark COP.R.CHEF. The composite cookware 1 is a three-ply bonded construction comprising an exterior layer 2 of copper bonded to a layer 3 of aluminum which, in turn, is bonded to a layer 4 of stainless steel such as austenitic 18/10 grade of stainless steel which forms the interior of the cookware 1. Copper layer 2 and aluminum layer 3 are prebonded separately and then hot roll bonded to the layer 4 of stainless steel.

The cookware 5 depicted in FIG. 2 is directed to a five-ply bonded composite comprising outer and interior layers 6 and 6', respectively, of stainless steel roll bonded to an innermost layer 8 of copper and interfaced between the stainless steel and copper layers with layers 7 and 9 of pure aluminum. This commercial cookware 5 is sold by All-Clad Metalcrafters LLC under the registered trademark COPPER-CORE and more fully disclosed in U.S. Pat. No. 6,267,830 to Groll which is incorporated by reference herein.

SUMMARY OF THE INVENTION

The present invention is intended to provide different metal combinations in multi-ply composite cookware to include the beauty of copper on the exterior coupled with its excellent heat distribution/conductivity properties within the interior to provide thermally efficient, durable and cosmetically pleasing cookware. In several embodiments of the present invention, a layer of silver is also preferably employed in the interior thereof between adjacent aluminum layers to further improve thermal conductivity.

DETAILED DESCRIPTION OF THE INVENTION

Figure 1:
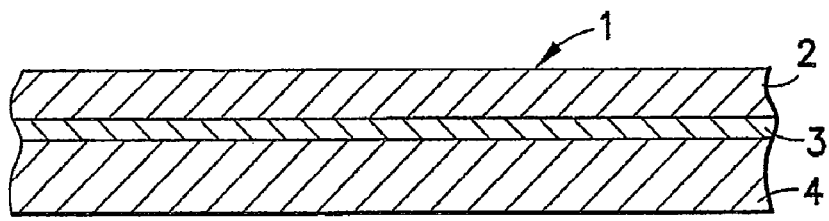
FIG. 1 is a cross section of a prior art three-ply composite construction for cookware.
Figure 2:
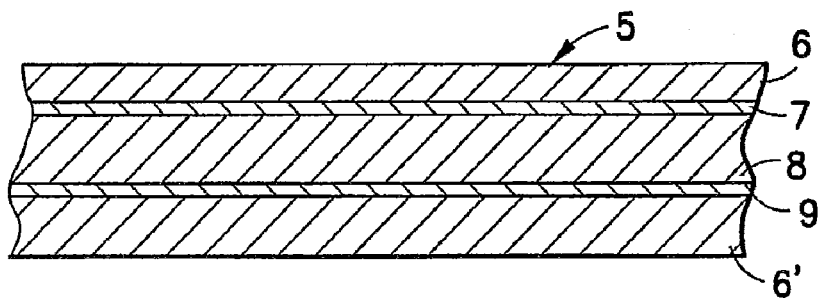
FIG. 2 is a cross section of another commercial five-ply cookware construction.
Figure 3:
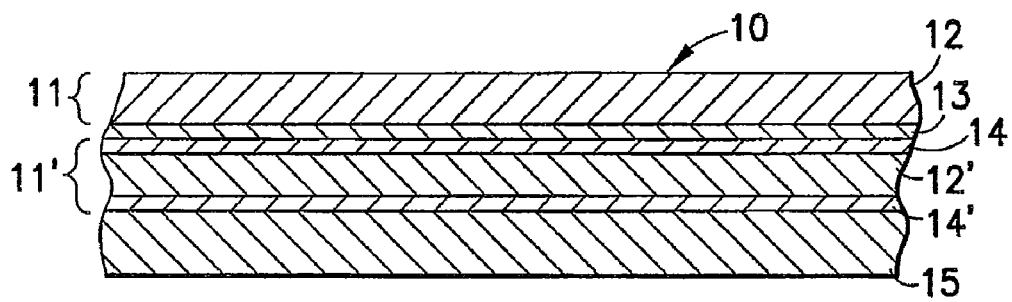
FIG. 3 is a cross-sectional view of one presently preferred embodiment of the present invention.

FIG. 3 depicts a cross-sectional view of a first embodiment 10 of cookware made according to the present invention. The composite cookware 10 comprises an outer layer of copper 12 cold roll bonded to a layer of aluminum 13 which may be pure aluminum, 3003 aluminum alloy or an Alclad aluminum. Copper layer 12 and aluminum layer 13 form a first prebond composite 11. A second prebond composite 11' is made up of a copper layer 12' sandwiched between aluminum layers 14 and 14'. First and second prebond composites 11 and 11' are then hot roll bonded to a layer 15 of stainless steel which forms the interior cook surface of the cookware 10.

Figure 4:
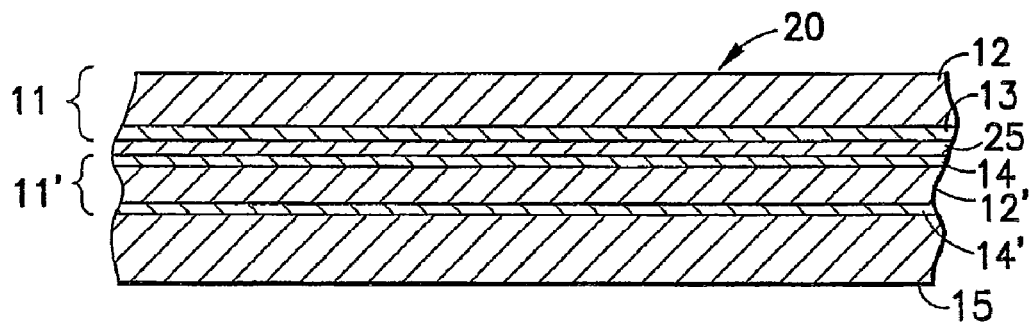
FIG. 4 is a further presently preferred embodiment of the present invention.

FIG. 4 depicts a second presently preferred embodiment of the present invention in the form of cookware generally designated 20. The multi-layer composite making up cookware 20 is the same as that described above with respect to FIG. 3 except for the addition of a layer of silver 25 positioned between and roll bonded to aluminum layer 13 of first composite 11 and the layer of aluminum 14 of second composite 11'. The silver material in layer 25 is preferably in the form of a thin foil having a thickness of about 0.003 to 0.005 inches. The silver layer 25 could also be applied by plating or other known means.

Figure 5:
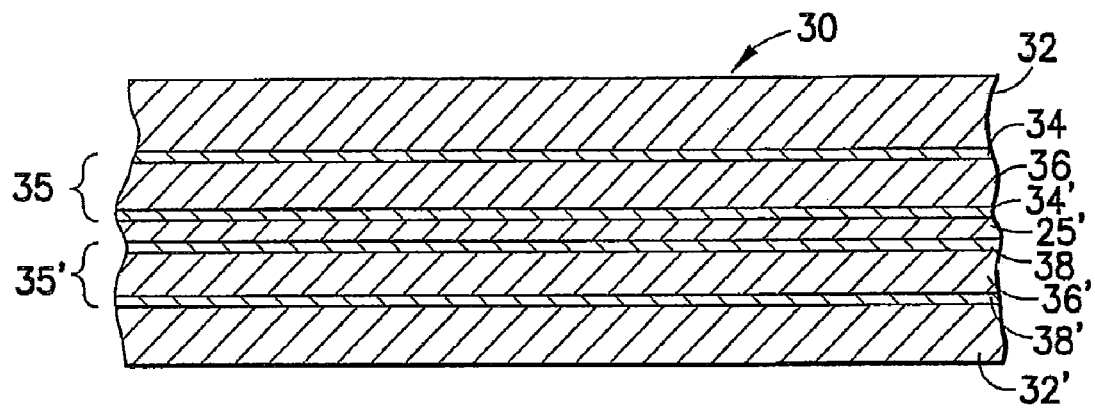
FIG. 5 is yet another presently preferred embodiment of the present invention.

FIG. 5 depicts a third presently preferred embodiment of the present invention in the form of a composite cookware construction 30. Composite cookware 30 comprises an outer layer 32 and an inner layer 32' of stainless steel (cook surface side) roll bonded to first and second prebonded composites 35 and 35' made up respectively of a copper layer 36 cold roll bonded to and between layers 34 and 34' of aluminum. In prebonded composite 35' a layer of copper 36' is cold roll bonded between layers 38 and 38' of aluminum. A layer of stainless steel 25' faces the aluminum layers 34' of the first composite 35 and the aluminum layer 38 of the second prebond composite 35'. In embodiment 30, a stacked array comprising stainless steel layer 32, first prebond composite 35, stainless steel layer 25', second prebond composite 35', and stainless steel layer 32' are placed together as shown in FIG. 5 and hot roll bonded together at an appropriate temperature in a rolling mill.

Figure 6:
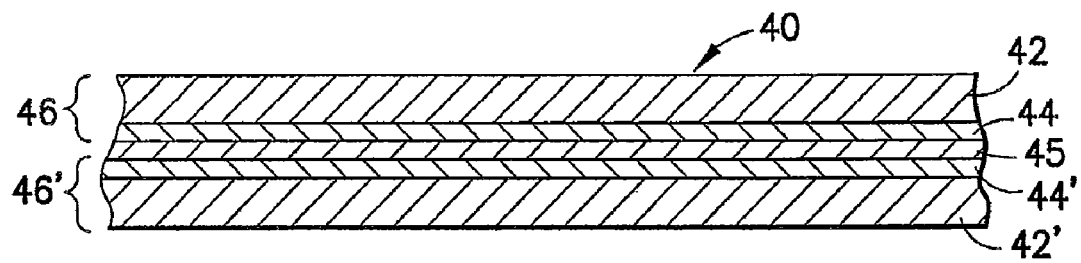
FIG. 6 is still yet another presently preferred embodiment of the present invention.

FIG. 6 shows a fourth presently preferred embodiment 40 of the invention which comprises a first prebond composite 46 made up of a layer of copper 44 cold roll bonded to a layer of stainless steel 42 and a second prebond composite 46' comprising a layer of copper 44' cold roll bonded to a layer of stainless steel 42'. The prebonded composites 46 and 46' are then hot roll bonded together with a layer of silver 45 interposed therebetween.

Figure 7:
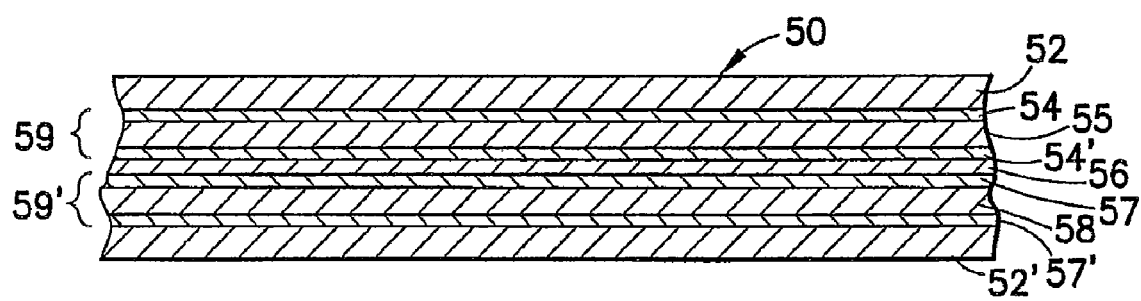
FIG. 7 is another presently preferred embodiment of the present invention.

In all of the above examples, the roll bonded composite materials 10, 20, 30 and 40 may be subjected to a post rolling heat treatment at about 650° F. to further strengthen the bond achieved during rolling. This in itself is well known in the art. The composite shapes can then be deep drawn into appropriate cookware shapes, such as pots, pans and the like. The exterior copper layer is given a final polish/buffing treatment to provide a beautiful cosmetic appearance to the finished cookware. The interior surface can also have a non-stick coating applied thereto if desired. In the embodiments of FIGS. 5-7, the outer layer of stainless steel, such as layer 32 and layer 34 of aluminum in FIG. 5, can be machined away to form one or more skived rings (not shown) around the perimeter of the cookware to show the underlying copper layer 36 as a decorative effect.

FIG. 7 depicts a fifth presently preferred embodiment 50 of my invention which includes outer layers 52, 52' of stainless steel, aluminum layers 54, 54', 57, 57', and copper layers 55, 58. The embodiment 50 is essentially the same as embodiment 30 of FIG. 5 except that the layer 56 is silver in embodiment 50 rather than stainless steel layer 25' in embodiment 30 of FIG. 5.

As used herein, the term "aluminum" can include pure aluminum of EC grade of the 1000 series of alloys, 3003 aluminum alloy, or Alclad aluminum. The stainless steel layer is preferably austenitic stainless steel, although a ferromagnetic grade may be substituted for outer layer 32', 52' if the cookware is to be induction heated. The copper layer in the prebond composites 11, 11', 35, 35', 59 and 59' preferably occupies at least about 80% of the thickness thereof, wherein the thickness of the prebond is about 0.035 inches. The surfaces of the metal sheets/prebond composites to be roll bonded are first mechanically abraded and cleaned to remove surfaced oxides and contaminants. Heating prior to hot rolling takes place in a slightly reducing furnace atmosphere at about 650° F. Hot rolling is done preferably in two passes at 1-10% reduction and 5-30% reduction, more preferably 5% and 15%.

The invention claimed is:

1. Composite cookware comprising in order: an outer layer of copper bonded to one or more layers of aluminum which is bonded to a core layer of copper, roll bonded to a further layer of aluminum which is bonded to an inner layer of stainless steel at a cooking surface of the cookware.

2. The composite cookware of claim 1 having two layers of aluminum bonded between the outer layer of copper and core layer of copper and further including a layer of silver disposed between said layers of aluminum intermediate said outer layer and core layer of copper.

3. Composite cookware comprising a first and second prebonded composite each consisting of a layer of stainless steel cold roll bonded to a layer of copper having a core layer of silver positioned between said first and second prebonded composites, wherein said core layer of silver is bonded to said first and second prebonded composites by hot rolling to the respective copper layers.

4. The cookware of claim 3 wherein one of the stainless steel layers defines an outer surface of the cookware and is a ferritic grade to render the cookware suitable for induction heating.

5. Composite cookware comprising in order: an outer layer of stainless steel bonded to a first aluminum layer, which is bonded to a first layer of copper bonded to a second layer of aluminum, which is bonded to a core layer of stainless steel, which is bonded to a third layer of aluminum, which is bonded to a second layer of copper, which is bonded to a fourth layer of aluminum, which is bonded to an inner layer of stainless steel at a cooking surface of the cookware, whereby the core layer of stainless steel retards the flow of heat in a transverse direction so as to cause a more uniform distribution of heat at said cooking surface.

6. The cookware of claim 5, wherein the outer layer of stainless steel is a ferritic grade so as to render the cookware suitable for induction heating.

7. The cookware of claim 5, wherein the inner layer of stainless steel has a non-stick surface applied thereto and the outer layer of stainless steel has a brushed surface finish.

8. The cookware of claim 6, wherein the inner layer of stainless steel has a non-stick surface applied thereto and the outer layer of stainless steel has a brushed surface finish.

9. The cookware of claim 5, having one or more skived rings formed around an outer perimeter thereof to expose the second layer of copper.

10. Composite cookware comprising in order: an outer layer of stainless steel bonded to a first aluminum layer, which is bonded to a first layer of copper bonded to a second layer of aluminum, which is bonded to a core layer of silver which is bonded to a third layer of aluminum, which is bonded to a second layer of copper, which is bonded to a fourth layer of aluminum, which is bonded to an inner layer of stainless steel at a cooking surface of the cookware.

11. The cookware of claim 10, wherein the outer layer of stainless steel is a ferritic grade so as to render the cookware suitable for induction heating.

12. The cookware of claim 10, wherein the inner layer of stainless steel has a non-stick surface applied thereto and the outer layer of stainless steel has a brushed surface finish.

13. The cookware of claim 12, wherein the inner layer of stainless steel has a non-stick surface applied thereto and the outer layer of stainless steel has a brushed surface finish.

14. The cookware of claim 10, having one or more skived rings formed around an outer perimeter thereof to expose the second layer of copper.

* * * * *